US006703724B1

(12) United States Patent
Hobson et al.

(10) Patent No.: US 6,703,724 B1
(45) Date of Patent: Mar. 9, 2004

(54) ELECTRIC MACHINE

(75) Inventors: Barry Reginald Hobson, North Lake (AU); Christopherr Paull Revill, Warwick (AU); Angelo Paoliello, Sawyer Valley (AU); Eric Roberts Laithwaite, deceased, late of Surrey (GB), by David William Bagnall, legal representative

(73) Assignee: Merlex Corporation PTY Limited, Highgate (AU)

( * ) Notice: Subject to any disclaimer, the term of this patent is extended or adjusted under 35 U.S.C. 154(b) by 0 days.

(21) Appl. No.: 09/723,816

(22) Filed: Nov. 28, 2000

Related U.S. Application Data

(63) Continuation-in-part of application No. 09/196,274, filed on Nov. 19, 1998, now Pat. No. 6,160,328.

(30) Foreign Application Priority Data

Nov. 13, 1998 (AU) ........................................... PP 7124

(51) Int. Cl.[7] ........................................... H02K 41/00
(52) U.S. Cl. ............................ 310/12; 355/53; 310/20
(58) Field of Search ............................ 310/12, 20, 37, 310/80, 91, 168, 171, 216, 268; 355/53, 72; 340/7.6, 390.1, 407.1

(56) References Cited

U.S. PATENT DOCUMENTS

| | | | | | |
|---|---|---|---|---|---|
| 3,064,150 | A | * | 11/1962 | Barnes | |
| 3,588,559 | A | * | 6/1971 | Fono | 310/168 |
| 3,721,844 | A | * | 3/1973 | Fong | 310/166 |
| 4,246,504 | A | * | 1/1981 | Clifford et al. | 310/181 |
| 4,554,475 | A | * | 11/1985 | Sisk | 310/208 |
| 5,153,494 | A | * | 10/1992 | Hollis, Jr. | 318/640 |
| 5,319,295 | A | * | 6/1994 | Van Patten et al. | 318/606 |
| 5,793,137 | A | * | 8/1998 | Smith | 310/114 |

* cited by examiner

*Primary Examiner*—Thomas M. Dougherty
*Assistant Examiner*—Judson H. Jones
(74) *Attorney, Agent, or Firm*—McGarry Bair PC

(57) ABSTRACT

An electric motor includes a Cockcroft ring for producing a magnetic field having lines of flux extending in a first direction through an air gap. A disc capable of at least two-dimensional motion in a plane relative to the Cockcroft ring provides a plurality of conductive paths, each path having a segment that extends through the magnetic field in a second direction so that interaction with an electric current passing through a particular segment produces a thrust force acting on the disc via that segment. A multiphase toroid shaped transformer induces electric currents to flow in the conductive paths and thus through the corresponding segments. The direction and magnitude of the respective thrust forces and thus the motion of the disc relative to the Cockcroft ring can be controlled by varying the magnitude and/or phase relationship of the electric currents flowing through the segments.

54 Claims, 11 Drawing Sheets

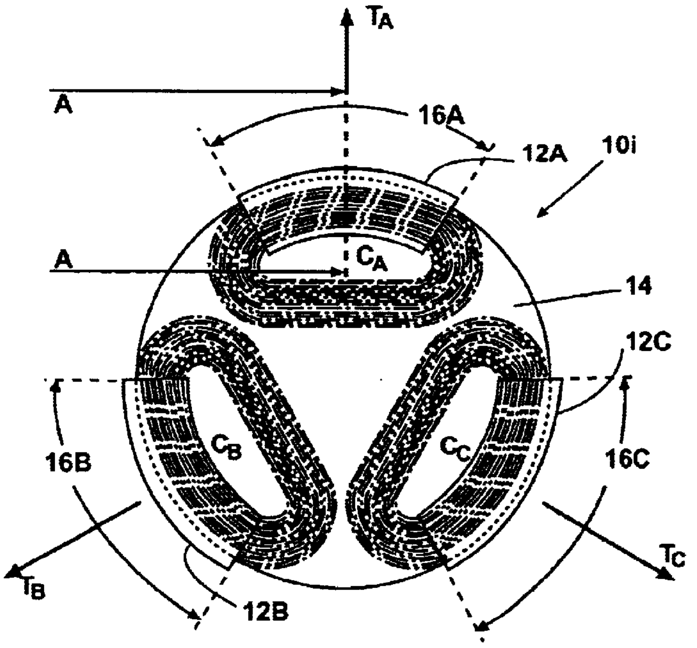
Fig. 1A
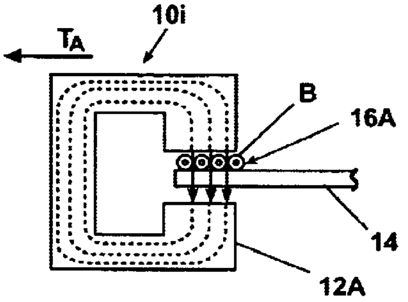
Fig. 1B
Fig. 1C
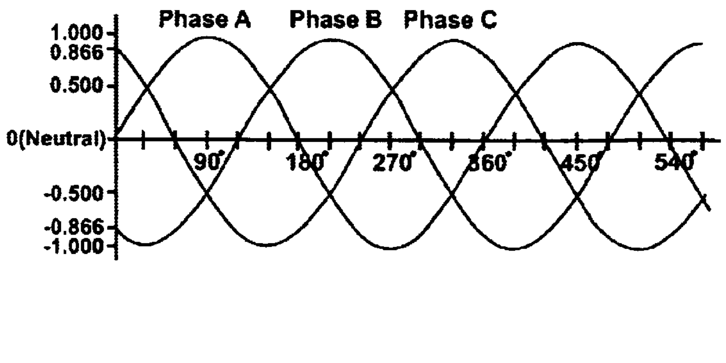

ELECTRIC MACHINE

CROSS-REFERENCE TO RELATED APPLICATIONS

This application is a continuation-in-part application of U.S. patent application Ser. No. 09/196,274, filed on Nov. 19, 1998, now U.S. Pat. No. 6,160,328, which claims the benefit of Australian Provisional Application filed on Nov. 13, 1998.

BACKGROUND OF THE INVENTION

1. Field of the Invention

The applicant is knowledgeable of the design and operation of pulverizing mills used to grind mineral samples into a fine powder. The pulverizing mill together with many other types of machines require an orbital or vibratory motion in order to work. These machines include for example screens for screening particles, cone crushers for crushing rocks, and shakers and stirrers for shaking and stirring laboratory solutions, biological/medical products and specifications, and the like.

The invention relates to an electric machine operable as a motor to provide motion required to drive a pulverizing mill but which can alternatively be operated as a generator to provide electricity or an electrical load.

2. Description of the Related Art

Traditionally, the orbital or vibratory motion required on such machines is imparted to an object by attaching the object to a spring mounted platform to which is coupled an eccentrically weighted shaft driven by a motor; or, via bearings to an eccentric shaft driven by a motor. A mechanical coupling such as a gear box, belt, or universal joint is used to couple the output of the motor to the shaft.

However, the very motion that these machines are designed to produce also leads to their inevitable and frequent failure. Specifically, the required orbital or vibratory motion leads to fatigue failure in various components of the machines including mechanical couplings, transmissions, bearings, framework and mounts. The cost of repairing such failures is very high. In addition to the cost of repairing the broken component(s) substantial losses can be incurred due to down time in a larger process in which the failed machine performs one or more steps. A further limitation of such machines is that they produce fixed orbits or motions with no means of dynamic control (i.e. no means of varying orbit path while machine is running).

The present invention has evolved from the perceived need to be able to generate orbital or vibratory motion without the limitations and deficiencies of the above described prior art.

It is also well known in the art that an electric machine can operate as a motor when driven by electricity to provide a mechanical output such as a rotation of a shaft and, can operate as an electricity generator or electrical load when a mechanical input is provided such as a rotation of a shaft by crank, water wheel, or similar means.

SUMMARY OF THE INVENTION

According to the present invention there is provided an electric machine having a magnet producing lines of magnetic flux extending through an air gap in a first direction. The air gap is formed by oppositely disposed magnetic poles. A support capable of at least two-dimensional motion relative to the magnet in a single plane contains the support.

The support is provided with at least two electrically conductive paths, each having a current carrying segment which extends with a circumferential aspect relative to a center of the support, and the segments are disposed in and extend across the lines of magnetic flux within the air gap in a second direction substantially perpendicular to the first direction. Thus, interaction of an electric current flowing through a particular segment and the lines of magnetic flux produces a thrust force to cause motion of the support relative to the magnet.

Preferably, the support is made of an electrically conductive material and is provided with a plurality of apertures disposed inboard of an outer peripheral edge of the support wherein at least one of the electrically conductive paths is constituted by the portions of the support that extend about the apertures. Also, preferably, the support is in the form of a wheel having a central portion hub with spokes extending radially outwardly from the central portion hub and an outer rim joining the spokes, respectively. Each aperture is thus defined in the wheel by the space formed between adjacent spokes and sectors of the central portion of the hub and rim. Each conductive path comprises two pairs of adjacent spokes and respective sectors of the central portion of the hub and rim extending between the two spokes.

In another aspect, the electric machine further includes an induction device for inducing an electric current to flow through the electrically conductive paths. Preferably, the induction device is supported separately from the support. Also, preferably, the induction device comprises a plurality of transformers, each having a primary coil and a core about which the primary coil winds. The core of each transformer interlinks with adjacent apertures so that an electric current flow in the primary coil of a transformer can induce an electric current to flow through the electrically conductive paths about the corresponding adjacent apertures.

In one embodiment, the induction device includes a transformer having a core formed into a closed loop and provided with a plurality of windows through which respective spokes of the support pass, each window bound by opposed branches of the core that extend in the same plane as the support and opposed pairs of legs of the core that extend in a plane perpendicular to the support. Also, with a plurality of primary coils, a primary coil wound about at least one of the branches of the core of each window. Thus, in use, when an alternating current is caused to flow through the primary coils, lines of magnetic flux are created that circulate about the windows in the core, the majority of the flux being shared in legs of the core between adjacent windows so that the lines of magnetic flux circulating about a particular window induce a current to flow through the spoke passing through that window and the conductive paths containing that spoke.

The number of segments can be equal to the number of electric phases supplied to the support. Also, preferably, the magnet is shaped as a closed loop magnet and provides a common polarity flux in the air gap. The device can include a coupling for mechanically coupling the support to a mechanical input that moves the support two-dimensionally in the single plane to induce an electric current to flow in the conductive paths. Thus, the machine can operate as an electric generator.

BRIEF DESCRIPTION OF THE DRAWINGS

In the drawings:

FIG. 1A is a schematic representation of the first embodiment of the electric machine;

FIG. 1B is an enlarged view of section A—A of FIG. 1A;

FIG. 1C is a graphical representation of a three-phase AC voltage/current supply;

DESCRIPTION OF THE PREFERRED EMBODIMENT

Figure 2:
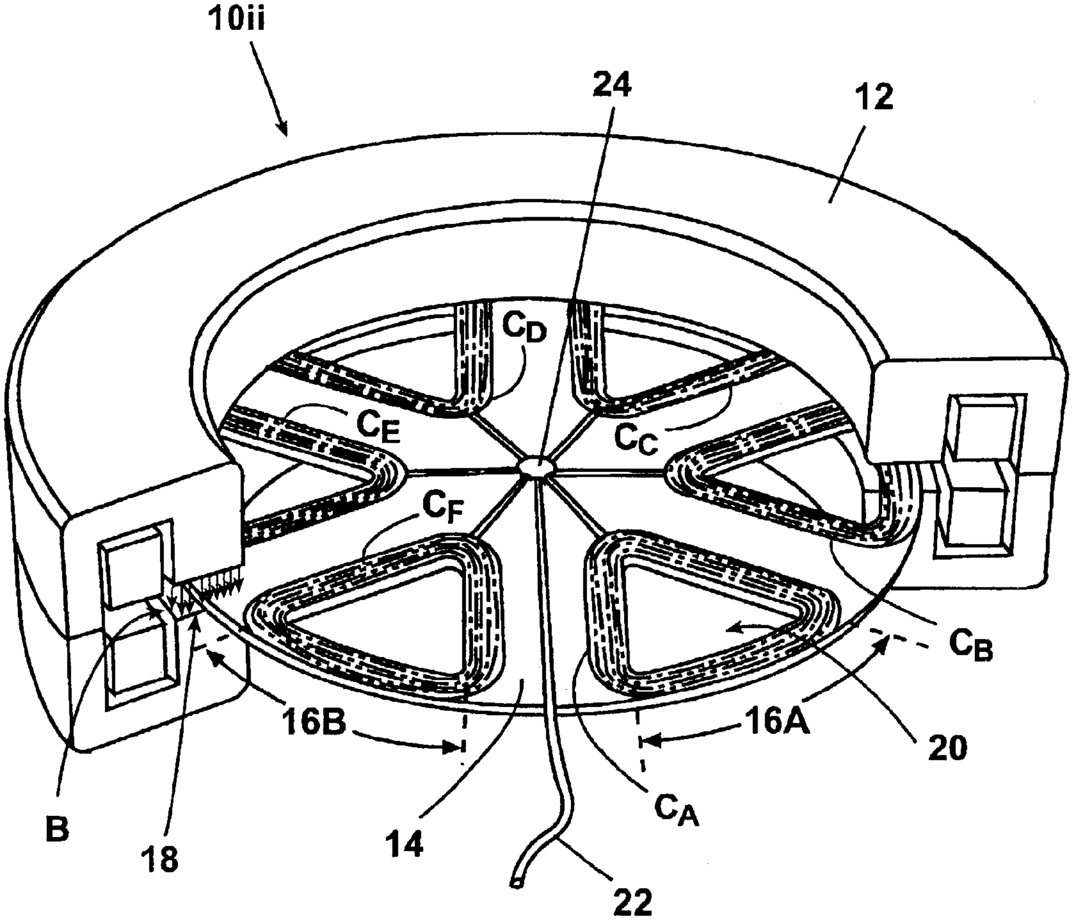
FIG. 2 is a partial cut away perspective view of a second embodiment of the electric machine.

Referring to FIGS. 1A and 1B, a first embodiment of the machine operates as an electric motor 10; includes magnetic field means in the form of three separate magnets 12A–12C (referred to in general as "magnets 12") each producing a magnetic field having lines of flux B extending in the first direction perpendicularly into the page. A support in the form of disc 14 is provided that is capable of two-dimensional motion relative to the magnets 12 in the plane or the page. The disc 14 is provided with a minimum of two, and in this particular case three, electrically conductive paths in the form of conductor coils $C_A$, $C_B$ and $C_C$ (referred to in general as "conductive paths"; "coils"; or "paths" C).

Throughout this specification and claims the expression "the disc (or support) . . . is provided with . . . electrically conductive paths" is to be construed as meaning that either the disc (support) has attached, fixed or otherwise coupled to it electrical conductors forming the paths, as shown for example in FIGS. 1–4; or, that the disc (support) is made of an electrically conductive material and does by itself provide or constitute the electrically conductive paths as shown for example in FIGS. 5–8B.

Consider for the moment the conductor path or coil $C_A$ and its corresponding magnet 12A. The path $C_A$ as a segment 16A that extends through the magnetic field B produced by the magnet 12A in a second direction preferably, but not essentially, perpendicular to the first direction, i.e. perpendicular to the lines of flux produced by the magnet 12A in a second direction preferably, but not essentially, perpendicular to the first direction, i.e. perpendicular to the lines of flux produced by magnet 12A. If a current with a positive polarity is caused to flow in coil $C_A$ say in the clockwise direction then the interaction of that current and magnetic field will produce a transverse thrust force $T_A$ that acts on the disc 14 via the segment 16A. In this instance the precise direction of the thrust force $T_A$ is provided by the right hand rule, assuming the flux B is in a direction into the page and thus, in this scenario will be directed in the upward direction in the plane of the page. The direction of thrust can also be determined with this right hand rule if the current is flowing counter clockwise in the coils or if the flux B is flowing upwards into the plane of the page. If in a further arrangement the current is provided with a negative polarity then a left-hand rule is used to determine the direction of thrust forces. The remaining coils or paths $C_B$ and $C_C$ likewise have corresponding segments 16B and 16C that extend in a direction perpendicular to the lines of magnetic flux of corresponding magnets 12B and 12C. Therefore, if electric currents are caused to flow in paths $C_B$ and $C_C$, say in the clockwise direction, then similarly thrust forces $T_B$ and $T_C$ will be produced that act on the disc 14 via the respective segments 16B and 16C and in directions as dictated by the right hand rule. The segments 16A and 16B (and indeed in this instance also segment 16C) are located relative to each other so that their respective thrust forces $T_A$ and $T_B$ do not lie on the same axis or line. By having two thrust forces directed along different axes or lines, two-dimensional motions of the disc 14 can be achieved. Moreover, the path of motion of the disc 14 can be controlled by varying the magnitude and/or phase relationship of the electric currents flowing through the segments 16A–16C (referred to in general as "segments 16").

In its simplest form, consider the situation where electric current is supplied to coil $C_A$ only in the clockwise direction. Thrust force $T_A$ is produced which causes the disc 14 to move in the direction of the thrust force. If coil $C_A$ is now de-energized and coil $C_B$ energized the disc 14 will move in a direction parallel to thrust force TB which is angularly offset by 120° from the direction of thrust force $T_A$. If coil $C_B$ is de-energized and coil $C_C$ energized the disc 14 will move in the direction of corresponding thrust force $T_C$ which is angularly offset by a further 120° from thrust force $T_B$. By repeating this switching process, it can be seen that the disc 14 can be caused to move in a triangular path in a plane, i.e. it can move with two-dimensional motion in a plane. A digital controller (not shown) can be used to sequentially provide DC currents to coils $C_A$–$C_C$ at various switching rates and various amplitudes for control of the motion of the disc 14. Also, the path or motion can be modified by causing an overlap in currents supplied to the segments. For example, current can be caused to flow in both coils $C_A$ and $C_B$ simultaneously, perhaps also with modulated amplitudes.

In this embodiment, three separate coils $C_A$, $C_B$, and $C_C$ are shown. However, as is clearly apparent to produce two-dimensional motion in a plane a minimum of two coils, for example $C_A$ and $C_B$, only is sufficient, provided the respective thrust forces $T_A$ and $T_B$ do not act along the same axis or line. Stated another way, what is required for a two-dimensional motion is that there is a minimum of two coils relatively disposed so that when their thrust forces are acting on the disc 14 they cannot produce a zero resultant thrust force on the disc (except when both the thrust forces themselves are zero).

Rather than the triangular motion described above, the disc 14 can be caused to move with a circular orbital motion by energizing the coils $C_A$, $C_B$ and $C_C$ with AC sinusoidal currents that are 120° (electrical) out of phase with each other.

It is to be appreciated that the circular orbital motion is not a rotary motion about an axis perpendicular to the disc 14, i.e. the disc 14 does not act as a rotor in the conventional sense of the word. In the present embodiment, if each of the coils $C_A$, $C_B$, and $C_C$ were connected to different phases in the three phase sinusoidal AC current supply, of the type represented by FIG. 1C, the disc 14 would move in a circular orbital motion. This arises because the total resultant force, i.e. the combination of $T_A$, $T_B$ and $T_C$ is of constant magnitude at all times. The difference in phase between the coils $C_A$, $C_B$ and $C_C$ leads to the direction of the resultant force simply rotating about the center of the disc 14. This is an angular linear force, not a torque. The frequency of the motion of disc 14 is synchronous with the frequency of the AC current to the coils $C_A$, $C_B$ and $C_C$. Thus, the motion frequency of disc 14 can be varied by varying the frequency of the supply voltage/current. A non-circular orbit can be produced by providing coils $C_A$, $C_B$, and $C_C$ with currents that are other than 120° out of phase and/or of different amplitude.

In the embodiment shown in FIGS. 1A and 1B, the disc 14 is made of a material that is an electrical insulator and the coils $C_A$, $C_B$ and $C_C$ are wire coils that are fixed for example by glue or epoxy to the disc 14. The coils $C_A$, $C_B$ and $C_C$ have separate leads (not shown) that are coupled to a voltage supply (not shown). The magnets 12 have a C-shaped section as shown in FIG. 1B providing an air gap 18 through which lines of flux B extend. The segments 16 of each of the coils C are located in the air gap 18 of their corresponding magnets 12.

FIG. 2 illustrates an alternate form of the motor $\mathbf{10}_{ii}$ which differs from the embodiment shown in FIG. 1 by replacing the separate magnets 12A, 12B and 12C with a single magnet 12 in the form of a Cockcroft ring and in which the disc 14 is provided with six conductive paths or coils—$C_A$–$C_F$. In order to reduce weight, the disc 14 is provided with six apertures or cut-outs 20 about which respective ones of conductive paths C extend. A multi-conductor cable 22 extends from a six phase power supply (not shown) to a central point 24 on the disc 14 where respective conductor pairs fan out to the coils C. The six phases required for the coils $C_A$–$C_F$ can be obtained from a conventional star of delta three phase power supply by tapping off the reverse polarities of each phase.

In the motor $\mathbf{10}_{ii}$ shown in FIG. 2, each conductive path or coil C has a segment 16 that is disposed in the air gap 18 of the magnet 12. As with the previous embodiment, when current is caused to flow through the segments 16, a transverse force is created due to the interaction between the current and the magnetic flux B, the transverse force is acting on the disc 14 via the respective segments 16. It will be recognized that many segments are relatively located to each other so that their respective thrust forces are not parallel to each other in the plane of motion of the disc 14, i.e. their respective thrust forces do not lie along the same axis or line. For example the thrust force arising from current flowing through segment 16A lies on a different line to the thrust force arising from current flowing through segment 16F. The same holds for say segments 16A and 16C; and 16B and 16D. Consequently, the disc 14 is again able to move in a two-dimensional planar motion. The fact that thrust forces produced on diametrically-opposed segments are parallel does not negate the existence of other thrust forces that do not act along the same axis or line to enable the generation of the two-dimensional planar motion.

In order to avoid rubbing of components and reduce friction, the disc 14 may be supported on one or more resilient mounts, e.g. rubber mounts or springs so that it is not in physical contact with the magnet 12.

It would be understood that a conventional grinding head can be attached to the disc 14 of the machine $\mathbf{10}_{ii}$ in FIG. 2 for grinding a mineral sample. The orbital motion of the disc 14 would produce the required forces to cause a puck or grinding rings within the grinding head to grind a mineral sample. However, unlike conventional pulverizing mills, the frequency of the orbital motion can be changed at will by varying the frequency of the AC supply to the coils C. Further, the actual path and/or diameter of motion can be varied from a circular orbit to any desired shape by varying the phase and/or magnitude relationship between the currents in the coils C while the machine is in motion.

Figure 3:
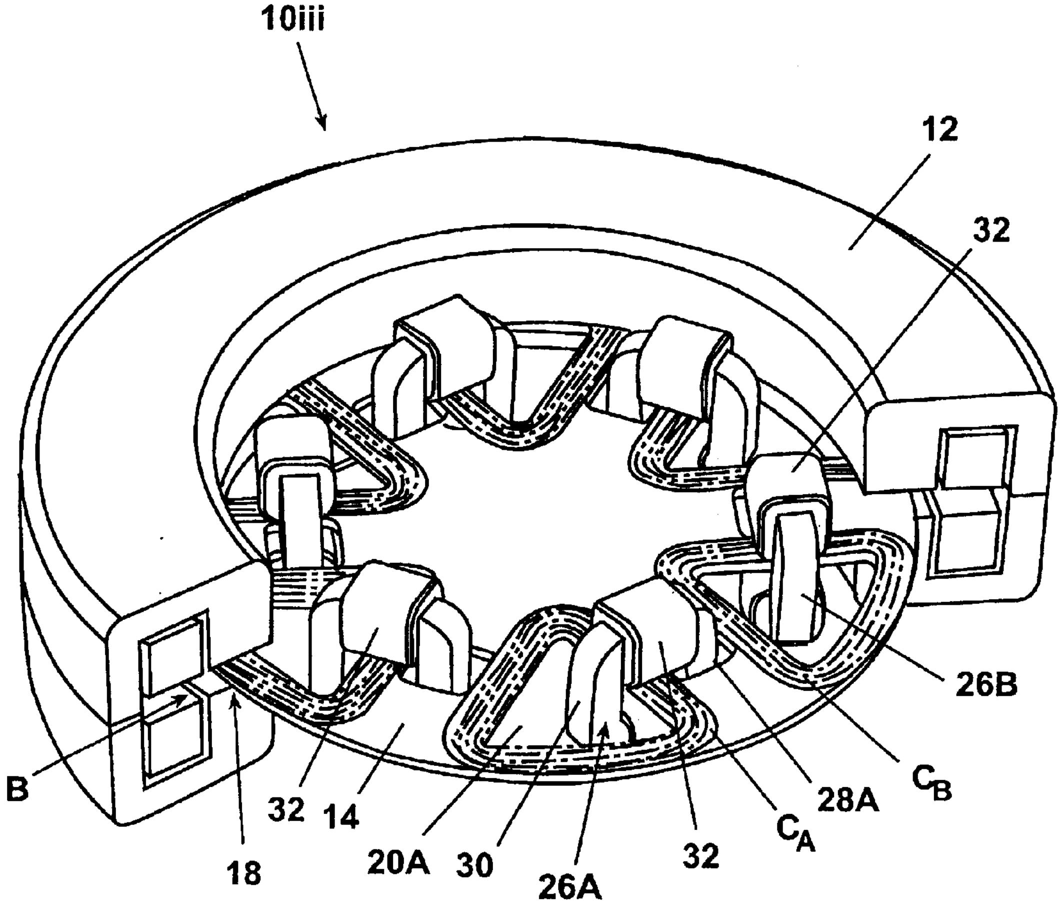
FIG. 3 is a partial cut away perspective view of a third embodiment of the electric machine.

A further embodiment of the electric motor $\mathbf{10}_{iii}$ is shown in FIG. 3. In the electric motor $\mathbf{10}_{iii}$ instead of each coil C being physically connected by a conductor to a current supply through multi-connector cable 22, current for each coil C is produced by electromagnetic induction using transformers 26A–26E (referred to in general as "transformers 26"). Further, the conductive paths (i.e. coils C) are now multi-turn closed loops. The disc 14 includes in addition to the apertures 20, a plurality of secondary apertures 28A–28F (hereinafter referred as "secondary apertures 28"), one secondary aperture 28 being located adjacent a corresponding primary aperture 20 with the apertures 20 and 28 being separated by a portion of the coils C extending about the particular primary aperture 20. Each transformer 26 has a core 30 and a primary winding 32. The primary winding 32 may be in the form of two physically separated though electrically connected coils located one above and one below the plane of the disc 14. The core 30 of each transformer links with one of the coils C so that coil C acts as secondary windings. This interlinking is achieved by virtue of the core 30 looping through adjacent pairs of apertures 20 and 28. It will be appreciated that a current flowing through the primary winding 32 of a transformer 26 will induce the current to flow about the linked coil C. The apertures 20 and 28, and core 30 are relatively dimensioned to ensure that the disc 14 does not impact or contact the core 30 as it moves in its two-dimensional planar motion. The transformers 26 are supported separately from the disc 14 and thus do not add any inertial effects to the motion of the disc 14. By using induction to cause currents to flow through the coils C the need to have a physical cable or connection as exemplified by multiconductor cable 22 in the motor $\mathbf{10}_{ii}$ is eliminated. This is seen as being particularly advantageous as cables or other connectors may break due to fatigue caused by motion of the disc 14 and also add weight and thus inertia to the disc 14.

Figure 4:
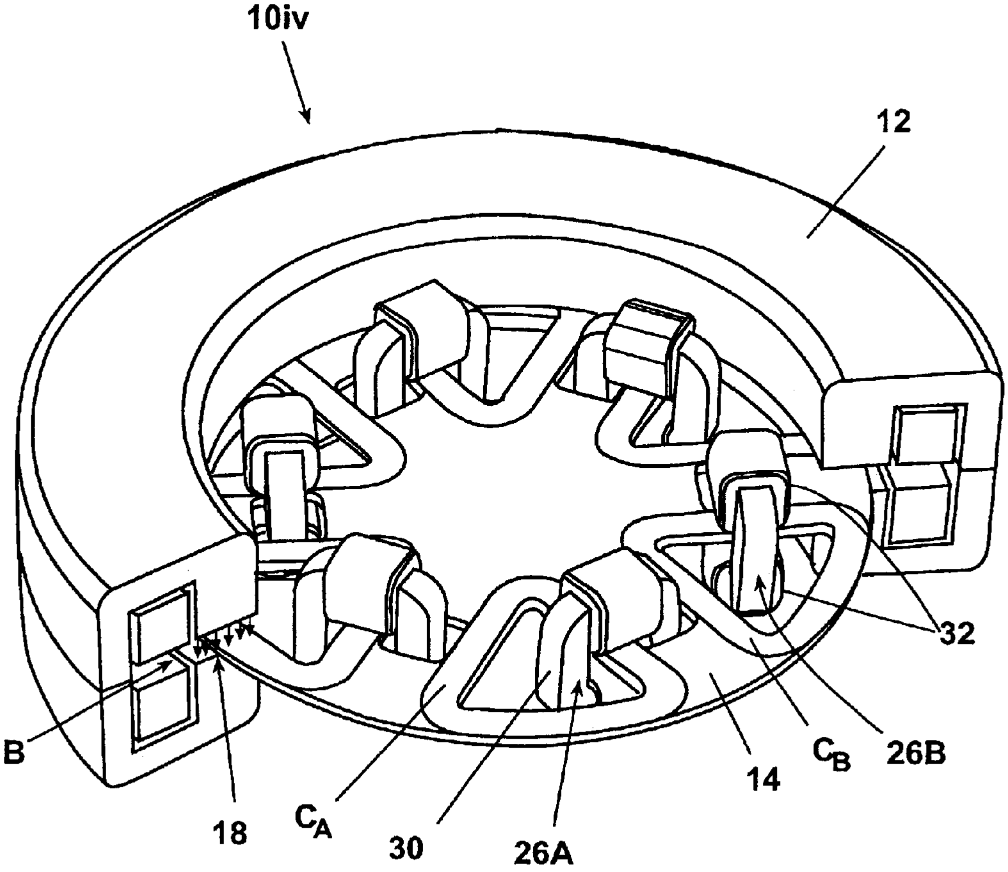
FIG. 4 is a partial cut away perspective view of a fourth embodiment of the electric machine.

FIG. 4 illustrates a further embodiment of the electric motor $\mathbf{10}_{iv}$. This motor differs from motor $\mathbf{10}_{iii}$ by forming the respective conductive paths C with a single turn closed loop conductor rather than having multiturn coils as previously illustrated. Replacing a multi-turn wire coil with a single solid loop has no adverse effects. The single solid loop behaves the same as the multi-turn coil with the same total cross-sectional area, where the current in the single loop equals the current in each turn of the coil multiplied by the number of turns, thereby giving the same resultant thrust force. Again, as with the previous embodiments, the motion of the disc 14 can be controlled by the phase and/or magnitude relationship of electric currents flowing through the segments 16 of each conductive path, i.e. conductive loop C.

Figure 5:
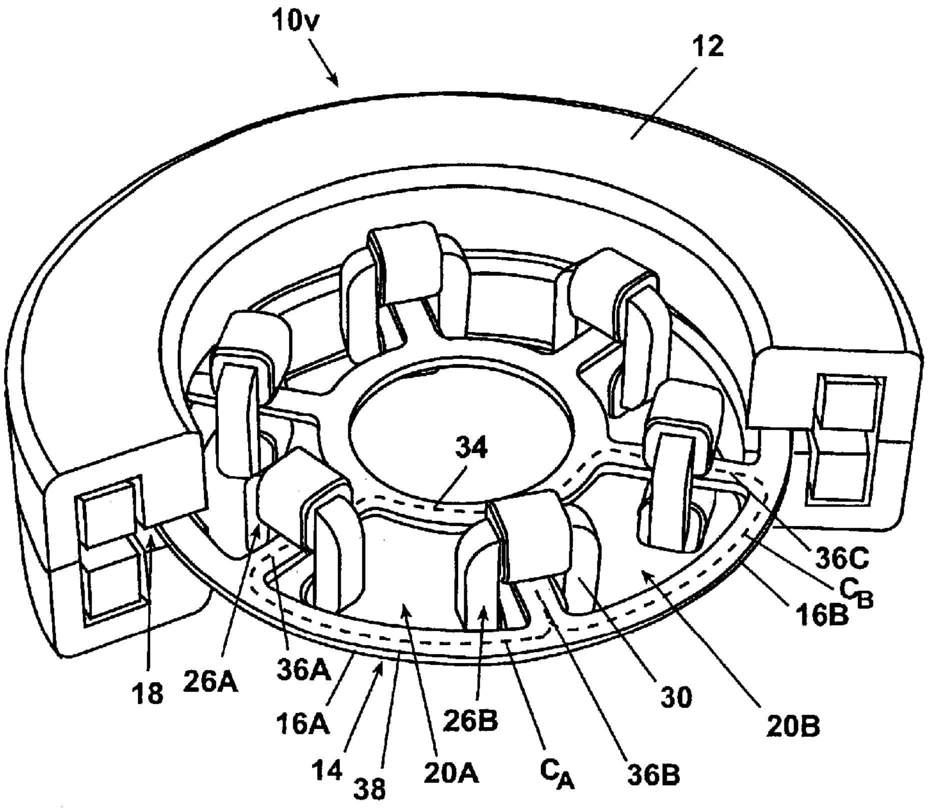
FIG. 5 is a partial cut away perspective view of a fifth embodiment of the electric machine.

FIG. 5 illustrates yet a further embodiment of the electric motor $\mathbf{10}_{v}$. This is a most remarkable embodiment as the conductive paths C are electrically connected together. In the motor $10_v$, the disc 14 is now in the form of a wheel having a central portion in the form of a hub 34, a plurality of spokes 36 extending radially outwardly from the hub 34 and an outer peripheral rim 38 joining the spokes 36. Apertures 20 similar to those of the previous embodiments are now formed between adjacent spokes 36 and the sectors of the hub 34 and rim 38 between the adjacent spokes 36. The disc 14 is made of an electrically conductive and most preferably non-magnetic material such as aluminum. The current paths are constituted by the parts of the disc 14 surrounding or bounding an aperture 20. For example, conductive path $C_A$ (shown in phantom) comprises the spokes 36A and 36B and the sectors of the hub 34 and 38 between those two spokes. Conductive path $C_B$ is constituted by spokes 36B and 36C and the sectors of the hub 34 and 38 between those two spokes. The sector of the rim 38 between adjacent spokes form the segment 16 for the conductive path containing those spokes. It is apparent that adjacent conductive paths C share a common spoke, (i.e. have a common run or log). Each transformer 26 links with adjacent apertures 20 and has, passing through its core 30 one of the spokes 36. Consider for the moment transformer 26B. The core of this transformer passes through adjacent apertures 20A and 20B with the spoke 36B extending transversely through the core 30 of the transformer 26B. The current induced into spoke 36B by the transformer 26B is divided between current paths $C_B$ and $C_A$. Thus the transformer 26B, when energized, induces a current to flow through both paths $C_A$ and $C_B$. In like fashion, each of the transformers 26 can induce the current to flow in respective adjacent conductive paths C. The state of the transformers will determine the current division between adjacent conductive paths C. Hence, the sectors of the rim 38 between adjacent spokes 36 and the currents flowing through them act in substance the same as the segments 16 in the motors $10_i$–$10_{iv}$.

Figure 6:
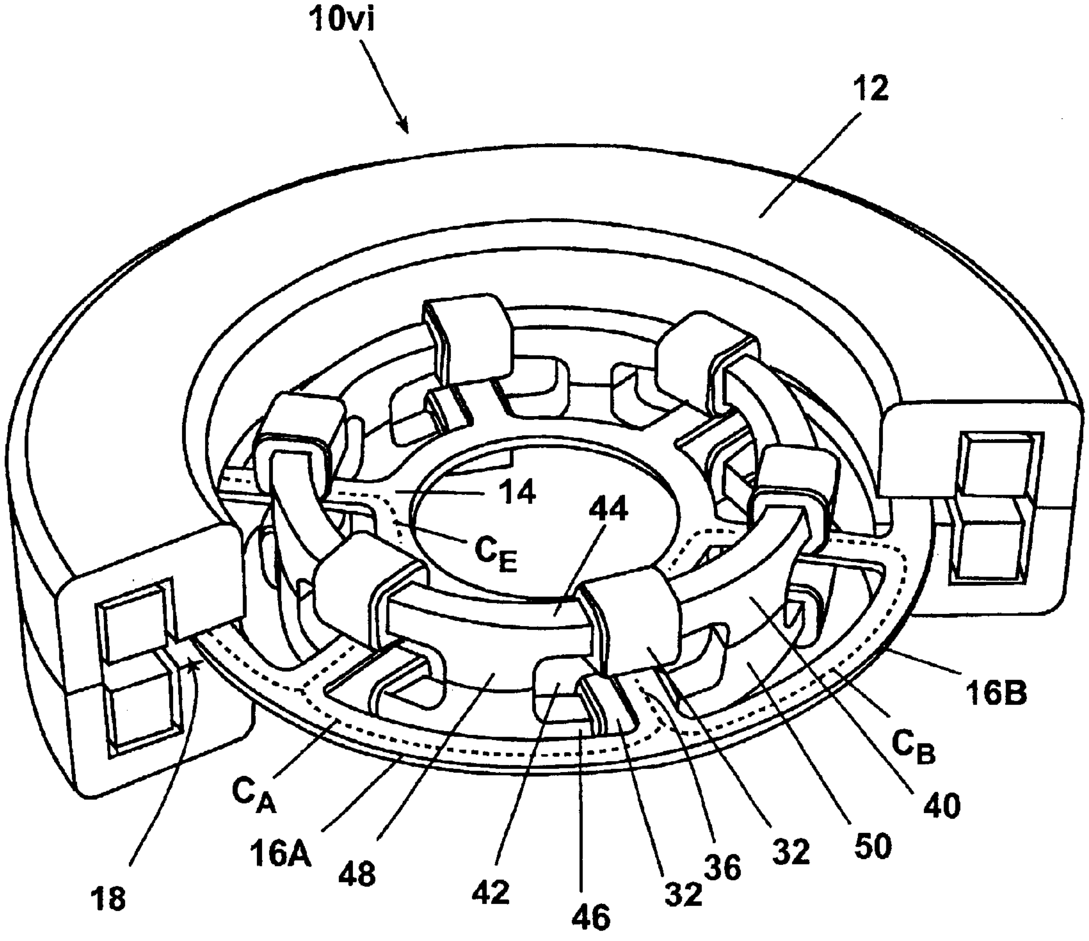
FIG. 6 is a partial cut away perspective view of a sixth embodiment of the electric machine.

FIG. 6 illustrates a further embodiment of the electric motor $10_{vi}$. This motor differs from electric motor $10_v$ by replacing the separate transformers 26 with a multi-phase toroid shaped transformer dubbed a "transoid" 40. The transoid 40 can be viewed as a ring of magnetically permeable material formed with a number of windows 42 and arranged so that separate conductive spokes 36 pass through individual different windows 42. Each window 42 is bound by opposed branches 44 and 46 that extend in the plane of the disc 14 and opposed legs 48 and 50 that extend perpendicularly to and join the opposed branches 44 and 46. Primary windings 32 are placed on each of the opposed branches 44 and 46 for every window 42. (Although it should be understood that primary winding can be placed anywhere within the window i.e., 44, 46, 48, 50 with one or more primary windings being utilized in various embodiments). Primary windings 32 are coupled to a six phase current supply in a manner so that the windings 32 for each window 42 are coupled to a different phase. Current flowing through the primary windings 32 sets up lines of magnetic flux circulating about the windows 42. This flux in turn induces the current to flow in the spoke 36 passing through that window 42 and the conductive path C to which that spoke 36 relates. It will be recognized that the majority of the flux generated about adjacent windows 42 will circulate through the common adjacent leg 48.

In comparison with the electric motor 10, shown in FIG. 5, the use of the transoid 40 makes more efficient use of its core because flux is shared from one or more primary coils. That is, magnetic flux induced by currents in primary coils about adjacent windows 42 can be shared through the common leg 48. Indeed more distant primary coils can contribute to the flux in that leg.

Figure 7:
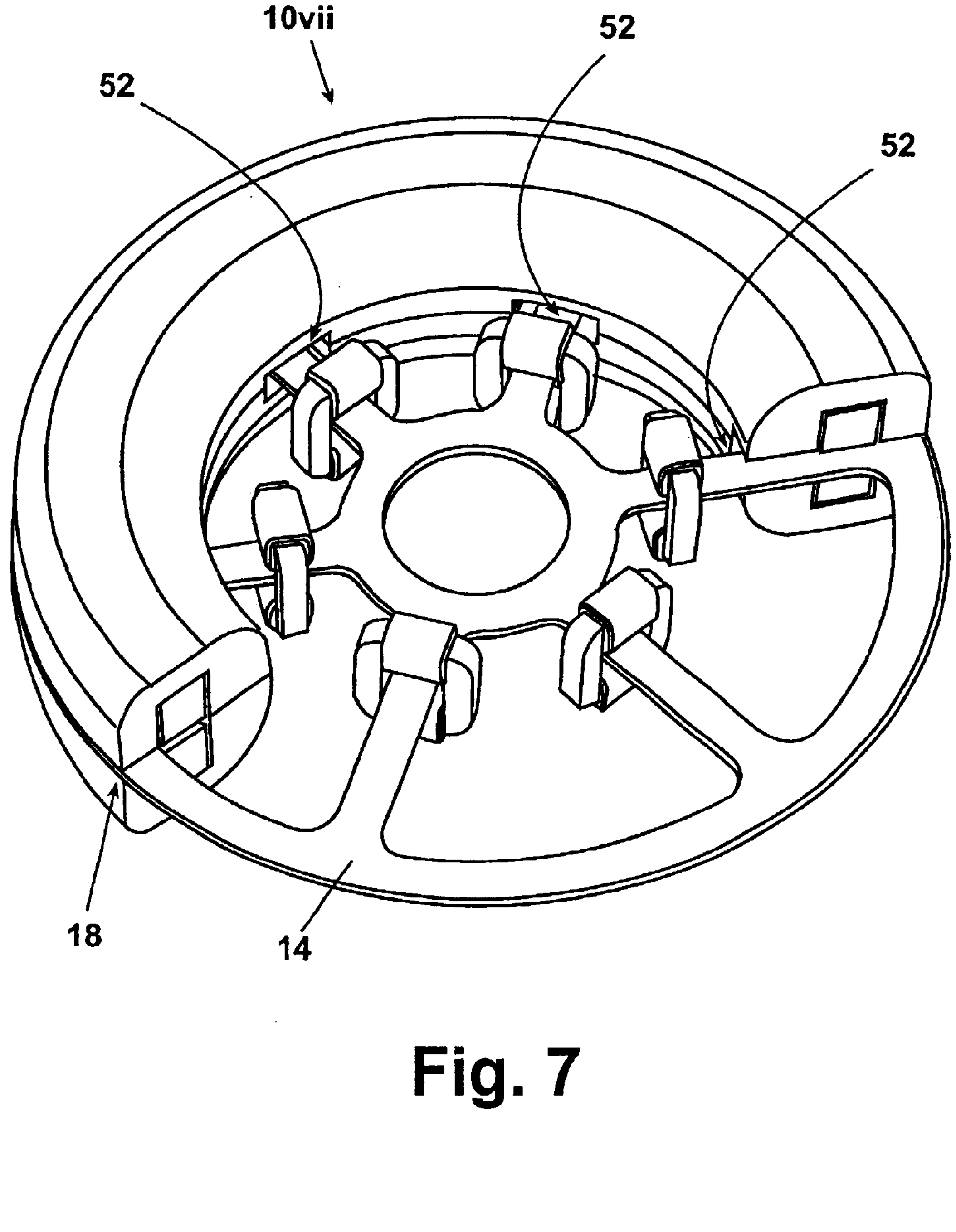
FIG. 7 is a partial cut away perspective view of a seventh embodiment of the electric machine.
Figure 8B:
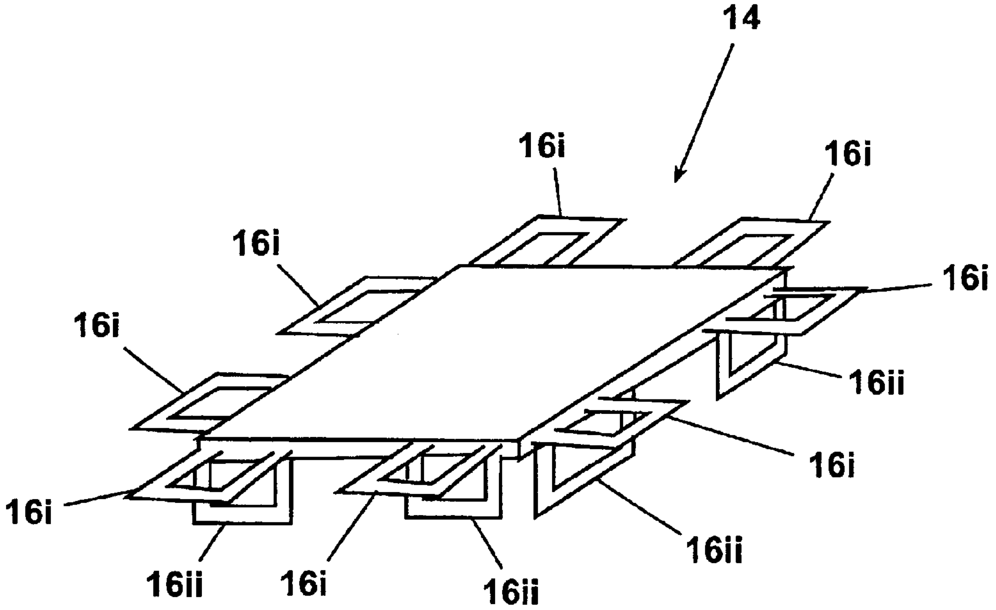
FIG. 8B is a perspective view of a support incorporated in the embodiment shown in FIG. 8A.
Figure 8A:
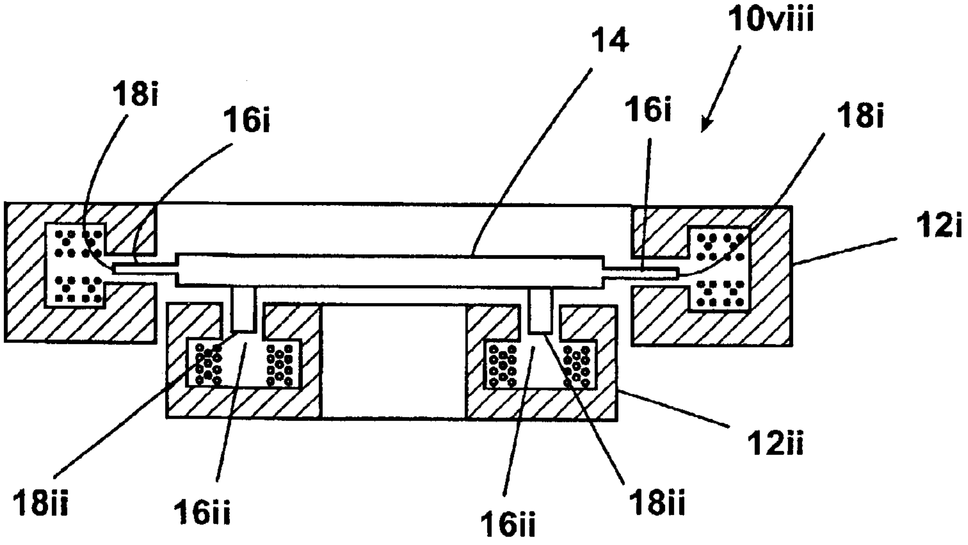
FIG. 8A is a partial cut away perspective view of an eighth embodiment of the electric machine.

A further embodiment of electric motor $10_{vii}$ is shown in FIG. 7. This embodiment differs from the motor $10_v$ shown in FIG. 5 in the configuration of the Cockcroft ring 12. In this embodiment, the air gap 18 of the Cockcroft ring is on the outer circumferential surface of the Cockcroft ring rather than on the inside surface as shown in FIG. 5. Additionally, a plurality of radially extending slots 52 are formed in the Cockcroft ring 12 through which the spokes 36 can pass. The slots 52 must be sufficiently wide to not inhibit the motion of the disc 14.

In the embodiment of the electric motor $10_{ii}$–$10_{vii}$ there are six segments 16 through which current flows to produce respective transverse forces that act on the disc 14. However, this can be increased to any number. Conveniently however the number of segments 16 will be related to the number of different phases available from a power supply used for driving the motor 10. For example, the motor 10 can be provided with twelve segments 16 through which current can flow by use of a twelve-phase supply. In this instance, therefore, transformers are used to induce currents to flow in each segments, there will be required either twelve separate transformers 26 as shown in FIGS. 4, 5, and 7 or alternately a twelve window transoid 40.

In the afore-described embodiments, the motion of the support 14 is a two-dimensional motion in one plane. However, motion in a second plane or more nonparallel planes can also be easily achieved by the addition and/or location of further segments 16 in the second or additional planes and, further means for producing magnetic fields perpendicular to the currents flowing through those additional segments. An example of this is shown in the motor $10_{viii}$ in FIGS. 8A and 8B in which the support 14 has one set of segments $16_i$ and a first plane (coincident with the plane of the support 14) and a second set of segments $16_{ii}$ that extend in a plane perpendicular to the plane of the support 14. The motor $10_{viii}$ has first magnet $12_i$ having an air gap $18_i$ in which the segments $16_i$ reside, and a second magnet $12_{ii}$ having an air gap $18_{ii}$ in which the second set of segments $16_{ii}$ reside. Thus, in this embodiment, the support 14 can move with a combined two-dimensional motion in the plane of the support 14 and an up and down motion in a second plane perpendicular to the plane of the support 14. Thus, in effect, in this embodiment, the support 14 can float in space by action of the thrust forces generated by the interaction of the current flowing through segments $16_{ii}$ and the magnetic field in the air gap of the magnet $12_{ii}$. It is also apparent from the previous motor embodiments $10_i$–$10_{vii}$ that the segments $16_i$ and $16_{ii}$ of the motor $10_{viii}$ can be individually supplied with electrical currents. In such instances the motion of the support 14 in the second plane is not just limited to a perpendicular up and down movement but can include motion with two degrees of freedom. As is apparent from FIG. 8B the support 14 need not be circular in shape but can be square (as in FIG. 8B) or any other required/desired shape. For the sake of clarity the means for supplying current to the segments $16_i$, $16_{ii}$ have not been shown. The currents may be provided by direct electrical connection to a current source as in the embodiments $10_i$ and $10_{ii}$ or via induction as in embodiments $10_{iii}$ to $10_{vii}$.

From the above description it will be apparent that embodiments of the present invention have numerous benefits over traditional machines used for generating vibratory or orbital motion. Clearly, as the motion of the disc 14 is non-rotational, there is no need for bearings, lip seals, gear boxes, eccentric weights or cranks. In addition, the inertial aspects of rotation, such as a time to accelerate to speed and gyroscopic effects are irrelevant. In the embodiments of the machine $\mathbf{10}_{ii}$–$\mathbf{10}_{vii}$ induction is used to cause current to flow in the segments 16 and thus commutators, brushes, and flexible electric cables are not required. It will also be apparent that the only moving part of the machine 10 is either the support 14 or the magnetic field means 12. When it is the support 14 itself that carries the electric current as shown in embodiments $\mathbf{10}_{v}$–$\mathbf{10}_{vii}$ this support 14 may be made from one piece only say by punching or by casting. In these embodiments the disc 14 must be made from an electrically conductive material and most preferably a non-magnetic material such as aluminum copper or stainless steel. When the machine 10 is used to generate an orbital motion from imparting to another object (for example a grinding head) there can be a direct mechanical coupling by use of bolts or screws.

The motor 10 is a force driven machine and the force it delivers is essentially unaltered by its movement. There is a small degree of back EMF evident, however the tests indicate that this is almost negligible, especially when compared with conventional rotating motors. As such, the motor 10 is able to deliver full force regardless of whether the disc 14 is moving or not. For this reason, current drawn by the motor 10 is relatively unaffected by the motion of the disc 14. This enables the motion of the disc 14 to be resisted or even stalled with negligible increase in current draw and therefore negligible increase in heat build-up.

In the conventional mechanical orbital or vibratory machines, the orbital or vibratory motion is usually fixed with no variation possible without stopping the machine to make suitable adjustments. With the motor $\mathbf{10}_{i}$ the orbit diameter is proportional to the force applied, which in turn is proportional to the currents supplied. Therefore the orbit diameter can be controlled by varying the supply voltage that regulates the current in the segment 16. This results in a linear control with instant response available, independent of any other variable. As previously mentioned, the orbit frequency is synchronous with the frequency of the supply voltage, so that orbit frequency can be varied by varying the supply frequency. The motor 10 also allows one to avoid undesirable harmonics. A common problem with conventional out of balance drive systems is that as the motor builds up speed it can pass through frequency bands coinciding with the actual harmonic frequencies of various attached mechanisms that can then lead to uncontrolled resonance that can cause damage to the machine or parts thereof. The disc 14 however is able to start at any desired frequency and does not need to ramp up front zero speed to a required speed. In this way any undesired harmonics can be avoided. Particularly, the motor 10 can be started at the required frequency with a zero voltage (and hence zero orbit diameter) and then the voltage supply can be increased until the desired orbit diameter is reached.

If no control over the orbit diameter or frequency is required, the motor 10 can be connected straight to a mains supply so that the frequency will be fixed to the mains frequency. Nevertheless, full control is not difficult or costly to achieve. Existing motor controllers which utilize relatively simple electronics with low computing requirements can be adapted to suit the motor 10. Because voltage supplies can be controlled electronically, the motor 10 can be computer driven. This enables preset software to be programmed and for safety features to be built into the supply controller allowing its operation to be reprogrammed at any time. The addition of feedback sensors can allow various automatic features such as collision protection. When the disc 14 is mounted on rubber supports, it can be considered as a spring-mass system. As such, it will have a harmonic or resonance frequency at which very little energy is required to maintain orbital motion at that frequency. If the machine 10 is only required to run at one frequency, the stiffness of the rubber supports can be chosen such that resonance coincides with this frequency to reduce the power losses and hence improve the machines efficiency.

While the description of the preferred embodiments mainly describes the disc 14 as moving in an orbit, depending on the capabilities of the controller for the supply, i.e. the ability to vary phase relationships and amplitudes of the supply current, the disc 14 can produce any shaped motion within the boundaries of its maximum orbit diameter.

Embodiments of the motor 10 can be used in many different applications such as pulverizing mills as previously described, cone crushers, sieve shakers, vibrating screens, vibratory feeders, stirrers and mixers, orbital sanders, orbital cutting heads, polishers and specific tools requiring a non-rotational motion, blood product agitators for blood storage systems, motion and stirring device for cell culture fermentors and bioreactors, tactile devices and motion alarms for personal pagers and mobile communication devices, planetary drive system for digital media storage systems or read heads for digital media system, friction welders for plastic components, dynamic vibration input device for testing components and structures, dynamic vibratory material feeder for hoppers and chutes, vibration device for seismic surveying, vibration cancellation platform for sensitive equipment and vibration cancellation device included for pipe-work attached to pumps, orbital/planetary motion device for acoustic speakers.

Further in the described embodiments the motion of the support/disc 14 relative to the magnetic field means 12 is achieved by having the support/disc 14 movable and the magnetic field means 12 fixed. However this can be reversed so that the support/disc 14 is fixed or stationary and the magnetic field means 12 moves. This may be particularly useful when it is required to impart and maintain, for example a vibratory motion to a large inertial mass. Also, it is preferred that the segments 16 extend through the magnetic field B at right angles to maximize the resultant thrust force. Clearly embodiments of the invention can be constructed where the segments 16 are not at right angles, though it is preferable to have some components of their direction at right angles to the field B to produce a thrust force.

Figure 9:
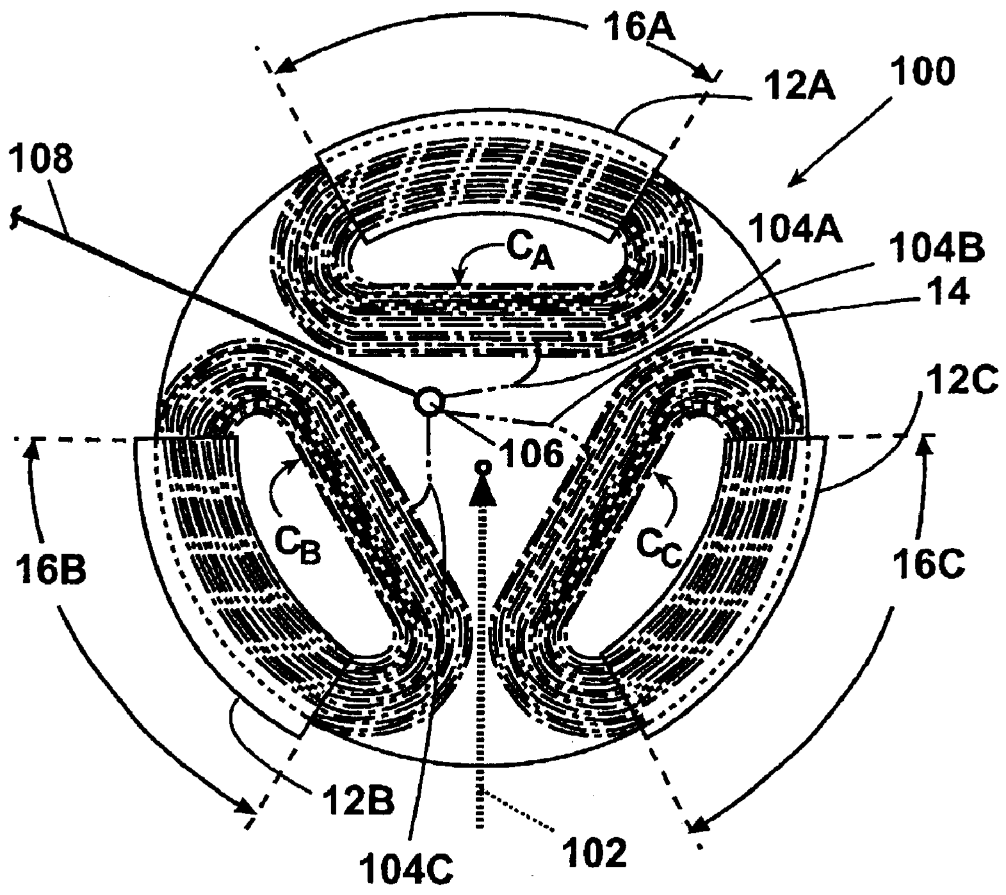
FIG. 9 is a schematic representation of the machine depicted in FIG. 1A showing the invention as an electricity generator.

Referring now to FIG. 9, the invention can also operate as an electricity generator 100. In FIG. 9, the mechanical input is represented schematically by the vector 102.

The mechanical input 102 is attached to the disc 14 through a conventional connection. The input 102 and the disc 14 are connected such that the movement of the disc 14 is coextensive with the plane of the disc 14. The mechanical input 102 is provided by a conventional apparatus capable of producing a two-dimensional motion, such as a triangular or circular orbital motion. Electrical leads 104A–104C connect the coils $C_A$–$C_C$ to a junction 106, to which is connected a multi conductor cable 108. The movement of the input 102 will create a corresponding movement of the disc 14. Movement of the disc 14 within the flux B of the magnets 12A–12C will induce a current in the coils $C_A$–$C_C$ which will be carried through the leads 104A–104C, junction 106, and cable 108.

Figure 10:
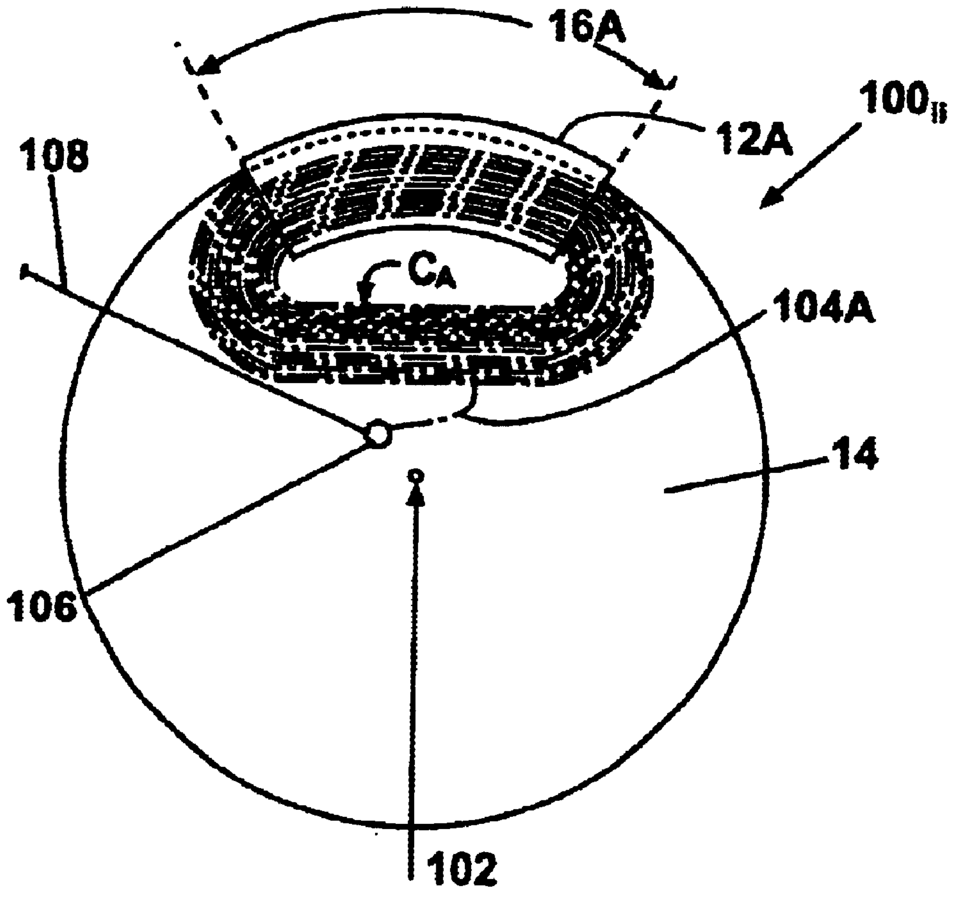
FIG. 10 is a schematic representation of a further simplified version of the machine depicted in FIG. 9.

A more basic version of the machine $\mathbf{100}_{i}$ is depicted in FIG. 10. The machine $\mathbf{100}_{i}$ differs from the machine 100 of FIG. 9 by the provision of a single electrical path only constituted by coil $C_A$. It would be appreciated that the motion provided by input 102 causing movement of the disc 14 in a plane would also lead to the induction of a current in the coil $C_A$ which is carried through lead 104A, junction 106, and cable 108.

In a further variation of the embodiment shown in FIG. 10 a second electrically conductive path or coil can be provided on disc 14 diametrically opposed to coil $C_A$. All other parameters being equal, the currents induced in coils $C_A$ and the diametrically opposed coil would have the same wave form but be out of phase by 180° with each. If such currents were added they will produce a nil result. However, the currents from the coils can be tapped individually. This is in contrast to the situation where the machine having diametrically opposed coils is operated as a motor in which case the thrust forces rising from currents flowing through the coils would be diametrically opposed and, if of the same magnitude, would result in no motion, and if not of same amplitude, would cause a reciprocating motion rather than a orbital motion as ordinarily required for a pulverizing mill.

Figure 11:
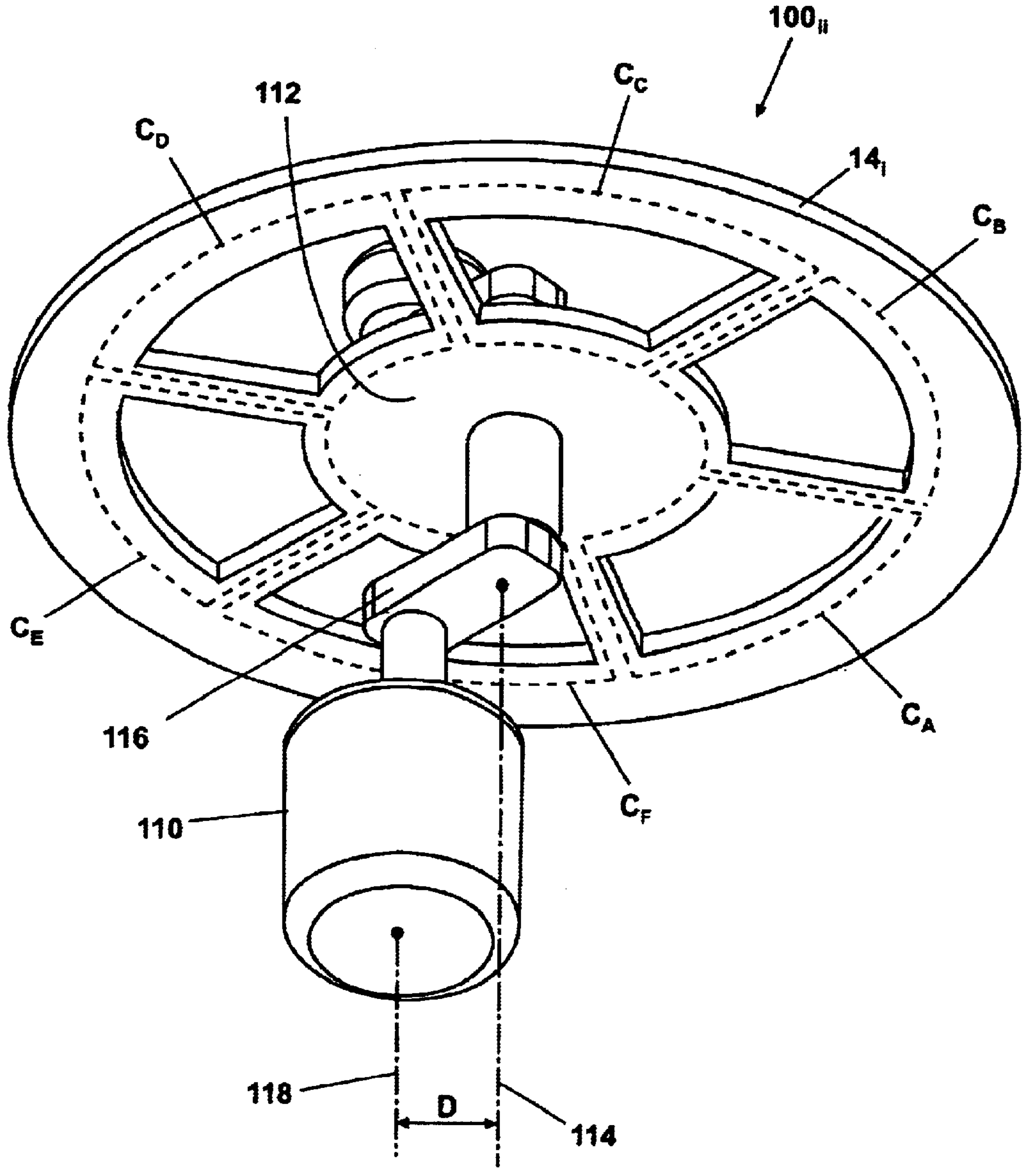
FIG. 11 is a perspective view of a portion of the machine depicted in FIG. 5 showing the invention as an electricity generator.

FIG. 11 illustrates how the machine $\mathbf{100}_{ii}$ of FIGS. 5 and 6 can be operated as a generator by coupling of the disc $\mathbf{14}_i$ to a mechanical crank 110. The disc $\mathbf{14}_i$ differs marginally from the disc 14 depicted in FIGS. 5 and 6 by forming the hub support as a solid web 112 to provide for coupling of the crank 110. The crank 110 is attached to a central axis 114 of the disc $\mathbf{14}_i$ which is offset by distance D by a crank arm 116 from a drive axis 118. The crank 110 is rigidly attached to the disc $\mathbf{14}_i$ so that the application of torque about the axis 118 causes an orbital motion in a plane of the support $\mathbf{14}_i$.

As with the machine depicted in FIGS. 5 and 6 individual wound cores or the "transoid" (depicted in FIG. 6) can be associated with the disc $\mathbf{14}_i$ to effectively tap off currents induced in the separate paths $C_A$–$C_F$ constituted by the support $\mathbf{14}_i$.

The machine when configured as a generator illustrated in FIGS. 9–11 can be mechanically directly coupled to the motor form of the machine depicted in FIGS. 1–8 by a mechanical linkage between the respective discs 14. Indeed such coupling has been made in order to allow measurement of the efficiency of the motor by comparing electrical power, output and output current/voltage waveform in the generator with the electrical input to the motor.

While the invention has been specifically described in connection with certain specific embodiments thereof, it is to be understood that this is by way of illustration and not of limitation, and the scope of the appended claims should be construed as broadly as the prior art will permit.

What is claimed is:

1. An electric machine including at least:

a magnet producing lines of magnetic flux extending through an air gap in a first direction formed by oppositely disposed magnetic poles; and, a support capable of at least two dimensional motion relative to said magnet in a single plane containing said support, said support provided with at least two electrically conductive paths each having a current carrying segment which extends with a circumferential aspect relative to a center of said support, said segments disposed in and extending across said lines of magnetic flux within said air gap in a second direction substantially perpendicular to said first direction; wherein interaction of an electric current flowing through a particular segment and said lines of magnetic flux produces a thrust force to cause said motion of said support relative to said magnet.

2. The electric machine according to claim 1, wherein the said magnet is configured to define a space in which said support is disposed and to provide access to both a top and bottom surface of said support.

3. The electric machine according to claim 1, wherein the said magnet is in the form of a closed loop and provides a common polarity flux in the air gap.

4. The electric machine according to claim 1, wherein the said magnet has an innermost side in which said air gap is formed.

5. The electric machine according to claim 1, wherein the said magnet has an outermost side in which said air gap is formed.

6. The electric machine according to claim 1, wherein each electrically conductive path comprises a single turn of conductive material, and each said segment carries a single phase of electric current through said lines of magnetic flux within the said air gap.

7. The electric machine according to claim 1, wherein said support is disposed relative to said magnet so that said segments are centrally located within the air gap.

8. The electric machine according to claim 1, wherein the said support has a central aperture.

9. The electric machine according to claim 1, further including a controller to provide electric current to each segment via said electrically conductive paths to provide variable relative motion between said support and said magnet, said relative motion determined by one or more of, amplitude, frequency, polarity and or phase relationship of the supplied electric currents.

10. The electric machine according to claim 1, further including an induction device associated with said electrically conductive paths for inducing currents to flow through said electrically conductive paths.

11. The electric machine according to claim 10, wherein said support is free of any electrical cable or terminal connection.

12. The electric machine according to claim 10, wherein said induction device is supported separately from said support.

13. The electric machine according to claim 1, wherein said support is made of electrically conductive material and is provided with a plurality of apertures, wherein at least one of said electrically conductive paths and its corresponding segment are constituted by portions of said support that extend about one of said apertures.

14. The electric machine according to claim 1, wherein said support is made of an electrically conductive material and is in the form of a wheel having a central portion, spokes extending radially outward from said central portion, and an outer rim joining said spokes, respective apertures being defined in said wheel between adjacent spokes and sectors of said central portion and rim between said adjacent spokes, and wherein each electrically conductive path comprises two spokes and respective sectors of said central portion and said rim extending between said two spokes.

15. The electric machine according to claim 13, including an induction device associated with said electrically conductive paths for inducing currents to flow through said electrically conductive paths wherein said induction device comprises a plurality of wound cores, each wound core having a core body made from a magnetically permeable material which interlinks adjacent apertures and an electric coil wound about said one.

16. The electric machine according to claim 14, including an induction device associated with said electrically conductive paths for inducing currents to flow through said electrically conductive paths said induction device including:

a core formed into a closed loop and provided with a plurality of windows through which respective spokes of said support pass, each window bound by opposed branches of said core that extend in planes lying parallel to said support and opposed legs of the core that extend in planes perpendicular to said support; and, a plurality of electrically conductive coils, at least one coil wound about at least one of the branches or legs of each window.

17. The electric machine according to claim 1, further including a coupling for mechanically coupling said support to a mechanical input that moves said support in said at least two dimensions in said single plane to induce an electric current to flow in said conductive paths, whereby said electric machine acts as an electric generator.

18. The electric machine according to claim 1, wherein the number of segments is equal to the number of electric phases supplied to said support.

19. The machine according to claim 1, wherein said support is made of electrically conductive material and said segments are constituted by sections of said support said segments being short circuited to each other.

20. The machine according to claim 1, further including a transformer, said transformer including a primary winding and at least one secondary winding, said secondary winding constituted by said support whereby, when electrical current is passed through said primary winding, current is induced to flow through said support and said segments.

21. An electric machine including at least:

a magnet producing lines of magnetic flux extending through an air gap in a first direction said air gap formed by oppositely disposed magnetic poles; and, a support provided with at least three electrically conductive paths, each path having a segment which extends with a circumferential aspect relative to a center of said support, said segments equally spaced from each other and disposed in and extending across said lines of magnetic flux within said air gap in a second direction substantially perpendicular to said first direction;

a first one of said segments disposed at a non-diametrically opposed location relative to a second one of said segments;

said support and magnet moveable relative to each other where said motion includes two dimensional motion in a single plane containing said support or said magnet;

wherein interaction of an elastic current flow through a particular segment and the said lines of magnetic flux create a thrust force to drive said relative motion of said support and magnet.

22. The electric machine according to claim 21, wherein said magnet is configured to allow access to both a top and bottom surface of said support.

23. The electric machine according to claim 21, wherein said magnet has an innermost side in which is formed said air gap and an outermost side which forms part of a magnetic flux return path of said magnet.

24. The electric machine according to claim 21, wherein said magnet has an outermost side in which is formed said air gap and an innermost side forming part of a magnetic flux return path of the said magnet.

25. The electric machine according to claim 21, wherein each electrically conductive path comprises a single turn of conductive material, and each said segment carries a single phase of electric current through said lines of magnetic flux within the said air gap.

26. The electric machine according to claim 21, wherein said support is configured to position at least one of said segments in the said air gap, wherein said segment stays under the influence of said magnetic flux throughout the extent of said relative motion of said magnet and support.

27. The electric machine according to claim 21, wherein said support is disposed relative to said magnet so that said segments are centrally located within said air gap.

28. The electric machine according to claim 21, wherein the said support has a central aperture.

29. The electric machine according to claim 21, further including a controller for providing said electrically conductive paths each with a different phase of a three phase sinusoidal AC supply, each of said phases being 120 degrees out of phase with each other.

30. The electric machine according to claim 29, wherein said relative motion generated is in the form of a circular orbital motion.

31. The electric machine according to claim 30, wherein said motion is of a frequency which is synchronous with the frequency of the AC supply to the said electrically conductive paths.

32. The electric machine according to claim 21, further including a controller for providing individually variable current to each of said electrically conductive paths to enable variation of one or more of phase relationship, frequency, polarity and amplitude of said currents to produce any desired pattern or direction of relative motion.

33. The electric machine according to claim 21, further including an induction device associated with said electrically conductive paths for inducing currents to flow through said electrically conductive paths.

34. The electric machine according to claim 33, wherein said induction device is supported separately from said support.

35. The electric machine according to claim 21, wherein said support is made of electrically conductive material and is provided with a plurality of apertures, wherein at least one of said electrically conductive paths and its corresponding segment are constituted by portions of said support that extend about one of said apertures.

36. The electric machine according to claim 21, wherein the support is made of an electrically conductive material and is in the form of a wheel having a central portion, spokes extending radially outward from central portion, and an outer rim joining said spokes, respective apertures being defined in said wheel between adjacent spokes and sectors of said central portion and rim between said adjacent spokes, and wherein each electrically conductive path comprises two spokes and respective sectors of said central portion and said rim extending between said two spokes.

37. The machine according to claim 35, including an induction device associated with said electrically conductive paths for inducing currents to flow through said electrically conductive paths said induction device comprising a plurality of wound cores, each wound core having a core body made from a magnetically permeable material which interlinks adjacent apertures and an electric coil wound about said core.

38. The electric machine according to claim 36, including an induction device associated with said electrically conductive paths for inducing currents to flow through said electrically conductive paths said induction device including:

a core formed into a closed loop and provided with a plurality of windows through which respective spokes of said support pass, each window bound by opposed branches of said core that extend in planes lying parallel to said support and opposed legs of the core that extend in planes perpendicular to said support; and, a plurality of electrically conductive coils, at least one coil wound about at least one of the branches or legs of each window.

39. The electric machine according to claim 21, wherein the number of segments is equal to the number of electric phases supplied to said support.

40. The machine according to claim 21, wherein said support is made of electrically conductive material and said segments are constituted by sections of said support, said segments being electrically short circuited to each other.

41. The machine according to claim 40, further including a transformer, said transformer including a primary winding and at least one secondary winding, said secondary winding constituted by said support whereby, when electrical current is passed through said primary winding, current is induced to flow through said support and said segments.

42. The electric machine according to claim 21, further including a controller for providing the said electrically conductive paths with a DC electrical supply.

43. The electric machine according to claim 21, further including a controller for providing individually variable current to each of said electrically conductive paths to enable variation of one or more of phase relationship, frequency, polarity and amplitude of said currents, to produce any desired pattern or direction of relative motion.

44. The electric machine according to claim 21, wherein said magnet is one of a plurality of magnets each of which is formed with an air gap through which lines of magnetic flux pass, and wherein individual segments are disposed in respective air gaps.

45. An electric machine including at least:

a magnet producing lines of magnet flux extending through an air gap in a first direction; and, a support provided with at least three electrically conductive paths, each path having an active current carrying segment which extends with a circumferential aspect to said support, said segments equally spaced from each other and disposed in and extending across said lines of magnetic flux within said gap in a second direction substantially perpendicular to said first direction;

a first one of said segments disposed at a non-diametrically opposed location relative to a second one of said segments;

said support and magnet moveable relative to each other where said motion includes two dimensional motion in a single plane containing said support or said magnet;

a coupling for mechanically coupling said support to a mechanical input that moves said support relative to said magnet to induce electric current to flow in said conductive paths, whereby said electric machine acts as an electric generator.

46. An electric machine according to claim 48, wherein each conductive path is provided with a lead that carries current generated from the conductive path.

47. An electric machine according to claim 46, wherein each lead is connected to a common junction.

48. An electric machine including at least:

a support mounted for motion in two dimensions in a single plane and provided with at least two electrically conductive paths; and, a magnet defining an air gap through which lines of magnetic flux extend;

each of said electrically conductive paths having a segment that is disposed in said air gap, said segments being short circuited together;

wherein at least two of said segments are positioned relative to each other so that when electric current flows through said segments, forces created by interaction of currents and magnetic flux do not lie along a common line.

49. An electric machine including at least:

first and second air gaps through which lines of magnetic flux extend; and, a support capable of non-rotary motion in at least two dimensions in a first single plane and motion in a second plane wherein said first and second planes are not parallel to each other, said support provided with at least two electrically conductive path, each having a segment lying in a plane parallel to said first plane and disposed in said first air gap, and at least two electrically conductive paths each having a segment lying in a plane parallel to said second plane and disposed in said second air gap;

wherein interaction of an electric current flowing through the segments and the magnetic field produces a thrust force acting on the support via that segment wherein the direction and magnitude of the respective thrust forces can be controlled by varying one or more of the amplitude, frequency, polarity and phase relationship of the electric currents flowing through the segments.

50. An electric machine including at least:

a magnet producing magnetic fields having lines of flux extending through a plurality of air gaps:

a movable support, said support provided with first and second sets of electrical conductors, each set of electrical conductors having two or more segments lying in respective non parallel common planes, said where two of the segments of each set are not located diagonally opposite each other; and wherein the segments of each set of conductors are disposed in respective air gaps, said segments further disposed so that respective thrust forces generated thereon by interaction of respective electrical currents flowing through said segments and said magnetic fields induces motion along or about respective axes in said planes.

51. A method for controlling motion of a support including the steps of:

providing said support with two or more electrically conductive paths each path having a segment that extends with a circumferential aspect relative to a center of said support;

providing one or more air gaps through which lines of magnetic flux extend said air gaps formed by oppositely disposed magnetic poles;

providing respective AC currents to said segments;

disposing said segments in respective ones of said air gaps, said segments further disposed so that thrust force generated by interaction of respective AC currents flowing through said segments and said magnetic flux induces two dimensional motion of said support in a single plane containing said support or said magnets; and, controlling one or more of the amplitude, frequency, polarity and phase of said AC electrical currents fed to respective segments to control said thrust forces and thereby control said motion of said support.

52. An electric machine including at least:

a plurality of magnets each having an air gap through which lines of magnetic flux extend said air gaps formed by oppositely disposed magnetic poles; and, a support provided with at least three electrically conductive paths, each path having a segment which extends with a circumferential aspect relative to a center of said support, said segments equally spaced from each other and disposed in respective air gaps and extending across said lines of magnetic flux in said air gap in a direction substantially perpendicular to said lines of magnetic flux;

a first one of said segments disposed at a non-diametrically opposed location relative to a second one of said segments;

said support and magnets moveable relative to each other where said motion includes two dimensional motion in a single plane containing said support or said magnets;

wherein interaction of an electric current flowing through a particular segment and the said lines of magnetic flux create a thrust force to drive said relative motion of said support and magnets.

53. An electric machine including at least:

a support provided with a plurality of electrically conductive paths, each path having a segment lying in a plane substantially perpendicular to a plane of said support, wherein any two segments are relatively disposed to each other at a non-diametrically opposed location;

providing one or more magnets having one or more air gaps through which lines of magnetic flux extend;

a magnet having an air gap through which lines of magnetic flux extend;

respective said segments disposed in one of said air gaps and extending substantially perpendicular to said lines of magnetic flux;

wherein interaction of respective electric currents flowing through said segments and said magnetic flux produces respective thrust forces acting on said support via a respective segment along an axis perpendicular to said plane of said support.

54. An electric machine including at least:

one or more magnets providing first and second air gaps through which lines of magnetic flux extend; and, a support moveable relative to said magnets, said support provided with at least two electrically conductive paths each path having a segment lying in a common first plane and disposed in said first air gap, and at least two electrically conductive paths each path having a segment lying in a corresponding plane which is not parallel to said first plane and disposed in said second air gap;

wherein interaction of an electric current flowing through the segments lying in said first plane and said lines of magnetic flux in said first air gap produce thrust forces acting between said magnet and said support along or about respective axes in said first plane, and interaction of an electric current flowing through the segments lying in said corresponding planes and the magnetic flux in said second air gap produce respective thrust forces acting on said support along or about axes lying in said corresponding planes, wherein the direction and magnitude of the respective thrust forces can be controlled by varying one or more of the amplitude, frequency, polarity and phase relationship of electric currents flowing through the segments.

* * * * *

UNITED STATES PATENT AND TRADEMARK OFFICE

CERTIFICATE OF CORRECTION

PATENT NO. : 6,703,724 B1
APPLICATION NO. : 09/723816
DATED : March 9, 2004
INVENTOR(S) : Barry Reginald Hobson et al.

It is certified that error appears in the above-identified patent and that said Letters Patent is hereby corrected as shown below:

Title page,
Item [56], References Cited, U.S. PATENT DOCUMENTS, add the following:

| | | |
|---|---|---|
| -- 6,369,400 | Haeberle | 04/09/2002 |
| 5,196,745 | Trumper | 03/23/1993 |
| 5,886,432 | Markle | 03/23/1999 |
| 6,072,251 | Markle | 06/06/2000 |
| 6,441,514 | Markle | 08/27/2002 |
| 5,925,956 | Ohzeki | 07/20/1999 |
| 6,097,114 | Hazelton | 08/01/2000 |
| 6,208,045 | Hazelton | 03/27/2001 |
| 6,147,421 | Takita | 11/14/2000 |
| 6,339,266 | Tanaka | 01/15/2002 |
| 5,334,892 | Chitayat | 08/02/1994 |
| 5,631,618 | Trumper | 05/20/1997 |
| 6,316,849 | Konkola | 11/13/2001 |
| 4,654,571 | Hinds | 03/31/1987 |
| 5,327,060 | Van Engelen | 07/05/1994 |
| 4,535,278 | Asakawa | 08/13/1985 |
| 5,699,621 | Trumper | 12/23/1997 |
| 5,120,034 | Van Engelen | 06/09/1992 |
| 3,967,146 | Howard | 06/1976 |
| 4,620,252 | Bauck et al. | 10/1986 |
| 4,764,695 | Inoue et al. | 08/1988 |
| 4,864,276 | Tribbey et al. | 09/1989 |
| 5,036,239 | Yamaguchi | 07/1991 |
| 5,471,103 | Fujii | 11/1995 |
| 5,793,133 | Shiraki et al. | 08/1998 --. |

UNITED STATES PATENT AND TRADEMARK OFFICE
CERTIFICATE OF CORRECTION

PATENT NO. : 6,703,724 B1
APPLICATION NO. : 09/723816
DATED : March 9, 2004
INVENTOR(S) : Barry Reginald Hobson et al.

It is certified that error appears in the above-identified patent and that said Letters Patent is hereby corrected as shown below:

<u>Column 12,</u>
Line 62, "wound about said one" should read -- wound about said core --.

Signed and Sealed this

Twentieth Day of June, 2006

JON W. DUDAS
*Director of the United States Patent and Trademark Office*

UNITED STATES PATENT AND TRADEMARK OFFICE

CERTIFICATE OF CORRECTION

PATENT NO. : 6,703,724 B1
APPLICATION NO. : 09/723816
DATED : March 9, 2004
INVENTOR(S) : Barry Reginald Hobson et al.

It is certified that error appears in the above-identified patent and that said Letters Patent is hereby corrected as shown below:

On the title page, item 56 add U.S. Patent Documents:
6,369,400 to Haeberle dated 04/09/2002
5,196,745 to Trumper dated 03/23/1993
5,886,432 to Markle dated 03/23/1999
6,072,251 to Markle dated 06/06/2000
6,441,514 to Markle dated 08/27/2002
5,925,956 to Ohzeki dated 07/20/1999
6,097,114 to Hazelton dated 08/01/2000
6,208,045 to Hazelton dated 03/27/2001
6,147,421 to Takita dated 11/14/2000
6,339,266 to Tanaka dated 01/15/2002
5,334,892 to Chitayat dated 08/02/1994
5,631,618 to Trumper dated 05/20/1997
6,316,849 to Konkola dated 11/13/2001
4,654,571 to Hinds dated 03/31/1987
5,327,060 to Van Engelen dated 07/05/1994
4,535,278 to Asakawa dated 08/13/1985
5,699,621 to Trumper dated 12/23/1997
5,120,034 to Van Engelen dated 06/09/1992
3,967,146 to Howard dated 06/1976
4,620,252 to Bauck et al. dated 10/1986
4,764,695 to Inoue et al. dated 08/1988
4,864,276 to Tribbey et al. dated 09/1989
5,036,239 to Yamaguchi dated 07/1991
5,471,103 to Fujii dated 11/1995
5,793,133 to Shiraki et al. dated 08/1998

UNITED STATES PATENT AND TRADEMARK OFFICE

CERTIFICATE OF CORRECTION

PATENT NO. : 6,703,724 B1
APPLICATION NO. : 09/723816
DATED : March 9, 2004
INVENTOR(S) : Barry Reginald Hobson et al.

It is certified that error appears in the above-identified patent and that said Letters Patent is hereby corrected as shown below:

In the claims:
Column 12, line 62 (claim 15): “wound about said one” should read -- wound about said core --

Signed and Sealed this

Fourth Day of July, 2006

JON W. DUDAS
*Director of the United States Patent and Trademark Office*